Nov. 10, 1925.

I. LANGMUIR

ELECTRIC OSCILLATOR

Filed Feb. 7, 1921

1,561,001

Inventor:
Irving Langmuir,
by *Albert G. Davis*
His Attorney.

Patented Nov. 10, 1925.

1,561,001

UNITED STATES PATENT OFFICE.

IRVING LANGMUIR, OF SCHENECTADY, NEW YORK, ASSIGNOR TO GENERAL ELECTRIC COMPANY, A CORPORATION OF NEW YORK.

ELECTRIC OSCILLATOR.

Application filed February 7, 1921. Serial No. 443,010.

*To all whom it may concern:*

Be it known that I, IRVING LANGMUIR, a citizen of the United States, residing at Schenectady, in the county of Schenectady, State of New York, have invented certain new and useful Improvements in Electric Oscillators, of which the following is a specification.

The present invention comprises an electric discharge device having novel characteristics, one of which is a negative volt-ampere characteristic over a working range of voltage bordered by voltage ranges having positive volt-ampere characteristics.

A device embodying my invention is characterized by a volt-ampere characteristic which, although permitting of stable operation under suitably chosen conditions, causes it to exhibit instability under a different set of working conditions so that when a suitable current is supplied oscillations of high frequency may be produced. A device embodying my invention comprises a closed receptacle containing a cathode, such, for example, as a heated wire or filament of tungsten, an anode, and a quantity of gas or vapor, preferably helium, neon or argon, at a pressure of about 5 to 75 microns of mercury. When suitable circuit conditions are provided as hereinafter explained, devices embodying my invention may be used for various technical purposes utilizing high frequency oscillations, as for example, signaling systems.

Mackay Patent No. 1,337,933 of April 20, 1920, discloses an electric oscillator having a cathode operating at incandescence in an inert gas, but in that device the gas is at a pressure of a higher order of magnitude than in my herein described device, and the discharge has a negative volt-ampere characteristic and other properties of an electric arc. In this prior device an inductance is used in the oscillation circuit whereas my new device when producing oscillations does not require an inductance in the oscillator circuit. The oscillations producible in my new device differ materially in character from the oscillations produced by the Mackay oscillator.

Figure 3:
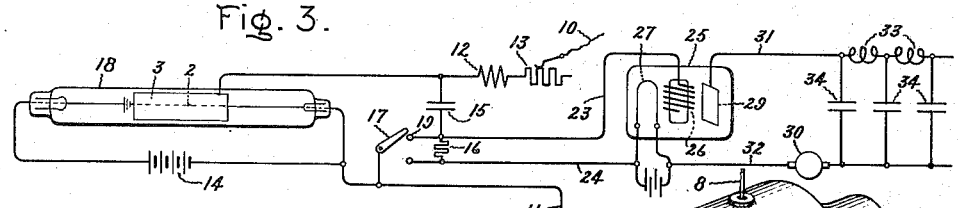
Figure 1:
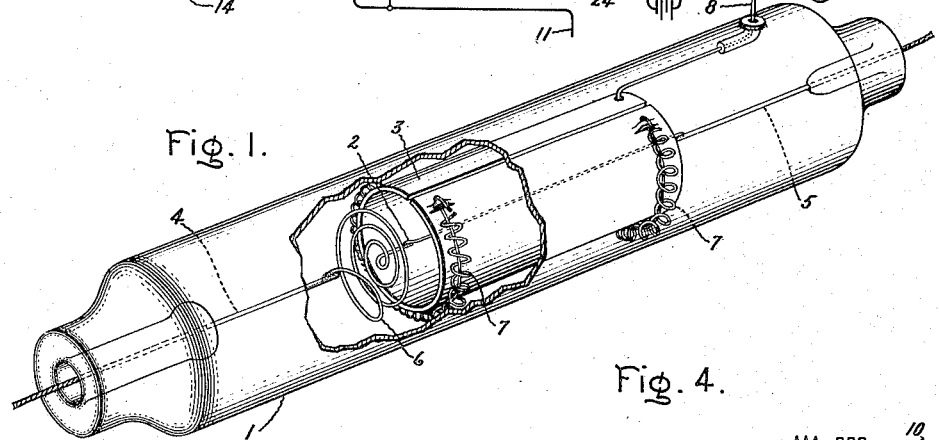
Figure 4:
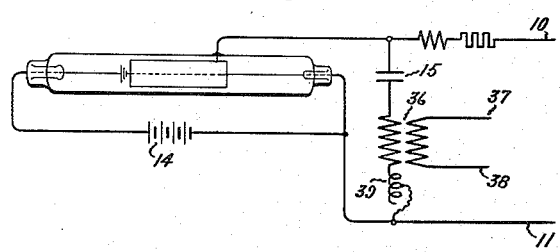
Figure 2:
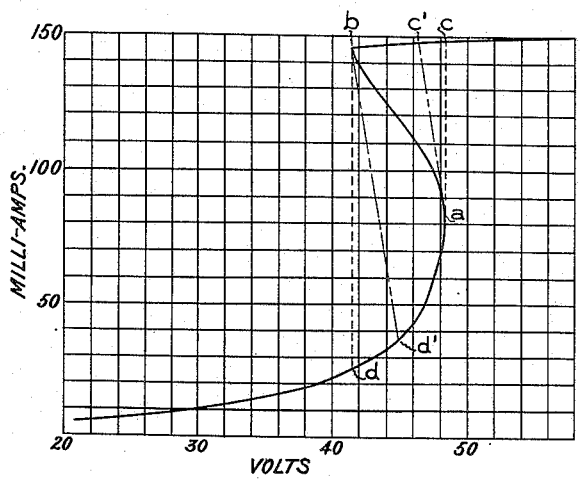
Figure 5:
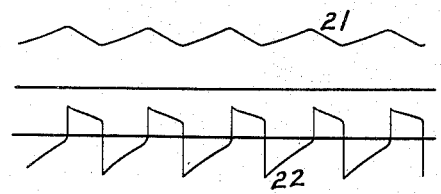

The novel features of my invention will be pointed out with greater particularity in the appended claims. For a more detailed description of my invention reference may be had to the following specification taken in connection with the accompanying drawing in which Fig. 1 illustrates one form of device embodying my invention; Fig. 2 is a diagram of an operating characteristic; Figs. 3 and 4 illustrate electric oscillator systems; and Fig. 5 illustrates diagrammatically current and voltage oscillations produced by my new device.

Referring to the drawing, the device shown in Fig. 1 comprises an envelope 1 consisting of glass, or other suitable material, into which is sealed a cathode 2 and an anode 3. The electrodes may assume a variety of configurations. In the device illustrated, the cathode consists of a substantially rectilinear filament composed of tungsten, or other suitable material, connected in the usual way to sealed-in conductors 4, 5, a spring 6 being interposed to keep the filament taut. The anode 3 consists of a slitted cylinder composed of tungsten, molybdenum, or other suitable material, which may be held in place by coiled wires 7 held in frictional engagement with the glass walls of the tube. Current connection to the anode is made by a sealed-in conductor 8.

The envelope preferably is first freed from water vapor and gases by exhausting to a low pressure while heating nearly to the softening point of the glass. Gases may be removed from the electrodes by electron bombardment. Helium, neon, argon, or other desired gas, thereupon is admitted at an appreciable pressure but below one millimeter of mercury pressure. At a desired gas pressure the envelope is sealed in the usual way.

The described device may be connected, for example, as shown in Fig. 3, to electric supply conductors 10, 11 with means for maintaining substantially constant current, such, for example, as a choke coil 12, and a resistance 13. The cathode is heated by any suitable source of energy, as, for example, a battery 14. A condenser 15 and a load device, represented by a non-inductive resistance 16, may be connected by a switch 17 across the conductors 10, 11, in shunt to the discharge device here designated as a whole as 18, but for the present the condenser may be assumed to be out of circuit.

The device will carry current with stable characteristics under suitably chosen conditions, for instance, when operated in circuit with a current limiting device to maintain substantially constant current. The current-voltage characteristic of the device when thus operated under stable conditions is peculiar. The current-voltage characteristics of one particular device have been plotted in Fig. 2 as illustrative of the general case. In this figure the voltages impressed across the terminals of the device have been plotted as abscissæ, the corresponding currents being plotted as ordinates.

Assuming the switch 17 to be open, and the series resistance 13 to be slowly decreased causing the electron current transmitted through the device 18 to increase, then with increase of current as the series resistance is decreased, the voltage across the terminals of the tube will rise first slowly, then more rapidly, until with further increase of current the voltage across the tube will fall, and at still higher current values the voltage again will increase. In the case illustrated, the voltage consumed in the device increased as the transmitted current increased up to about 80 milliamperes, the voltage then decreased as the current further increased to about 145 milliamperes, and the voltage thereupon rose as the series resistance was lowered still more, the transmitted current rising above 145 milliamperes.

This peculiar volt-ampere characteristic of the device makes it unstable when operated with a capacity connected in shunt. The oscillations then set up may be used for any desired purpose, for example, the device may be used as a master oscillator to control one or more amplifiers in a telegraphic, telephonic, or other system. While I do not wish to be restricted by any particular theory as to the mode of operation of my device, I will explain what I believe to be the cycle of variations when the device is oscillating.

Assume a substantially constant current value through the device, say about 115 milliamperes to permit of reference to the curve shown in Fig. 2, and the switch 17 contacting with the contact 19 to connect the condenser 15 only across the lines 10, 11, without the resistance 16. If the condenser 15 has a capacity at least as great as a few thousandths of a microfarad, oscillations will be set up, the frequency of which is approximately inversely proportional to the capacity of the condenser.

Suppose for any reason that the current in the tube 18 tends to decrease perceptibly along the negative part of the characteristic, the surplus current from the constant current source supplying the tube will flow into the condenser. The voltage on the terminals 2, 3, of the tube will rise accordingly thereby producing further decrease of current through the tube until the voltage across the tube rises to a value $a$, Fig. 2. It can go no further in this direction, but will jump to the leg of the curve above the critical value $b$. With substantially no resistance in the circuit this will be a value $c$ corresponding to a greater current through the tube. The current through the tube being greater at this point than the assumed value of the supply, the condenser will discharge in order to supply current to the tube. As the condenser becomes discharged the voltage falls and current through the tube again decreases until it reaches a critical value $b$. Here the current must jump to the value $d$ on the lower part of the curve, which corresponds to a lower current through the tube than the constant current supply of 115 milliamperes. The condenser again charges with a rise of voltage. When the voltage across the condenser which is also the voltage across the tube, reaches the point $a$ it can rise no higher without leaving the curve. Hence, the current through the tube again jumps to the value $c$ and the cycle is repeated, the dotted lines indicating the swing of the current. The character of the voltage and current waves, as recorded by the oscillograph, is shown in Fig. 5 by curves 21 and 22, respectively.

These oscillations may be utilized by any desired load device, as represented by the resistance 16. For example, the conductors 23, 24, may be connected to an amplifier 25 when the switch 17 completes a circuit through the contact 9, forming a terminal for the conductor 24. As a fraction of the energy is consumed in the resistance load device 16, the oscillations then will proceed as shown in Fig. 2 along the dash and dot lines $a$, $c'$ and $b$, $d'$ when jumping from one part of the current-voltage curve to another. The voltage oscillations across the terminals of the resistance 16 are impressed by the conductors 23, 24 upon the grid 26 and the cathode 27 of the amplifier. The cathode 27 and the anode 29 are connected in series with a suitable direct current generator 30 to a circuit 31, 32 which may be connected to any desired load circuit, or translating device in which the oscillations are to be utilized, for example, a bank of amplifier tubes connected in parallel and having their control circuits connected in common to the circuit 31, 32. If desired, a filter comprising inductances 33 and capacities 34 may be used in the output circuit to obtain a pure sine wave.

In Fig. 4 I have shown a transformer 36 having a primary coil connected in series with the condenser 15 in a system similar to the system described in connection with Fig. 3. The secondary of the transformer is connected to conductors 37, 38, from which the oscillations may be utilized for any desired purpose. As some inductance will be introduced by the transformer the oscillations in conductors 37, 38, will be more rounded than the oscillations shown in Fig. 5. In fact, if desired, a variable inductance 39 may be introduced in series with the primary of the transformer 36.

What I claim as new and desire to secure by Letters Patent of the United States, is:—

1. In combination, an electron discharge device comprising a sealed container, a cathode of substantially rectilinear form, means for heating said cathode independently of a discharge in said device, a surrounding substantially cylindrical anode, and a filling of helium gas having a pressure of about 5 to 75 microns of mercury, and a condenser connected in shunt with said device.

2. In combination, an electron discharge device comprising a sealed envelope, an atmosphere of gas therein at an appreciable pressure but substantially below one millimeter of mercury, electrode means for producing an electron discharge through said gas having a negative volt-ampere region followed at higher currents by a positive volt ampere region, a current limiting means in circuit with said device, and an electric storing and restoring means operatively associated with said device 3. An electric apparatus comprising in combination a discharge device provided with an electron-emitting cathode, an anode and a gas filling at a pressure of about 5 to 75 microns of mercury, said device being organized to operate over part of a working range with a negative volt-ampere characteristic and to operate below and above said part with a positive characteristic, a current-limiting device connected in circuit with said device, a work circuit connected to said device and means cooperating with said device for producing electric oscillations.

4. A device for converting direct to alternating current comprising the combination of a source of substantially constant current, an electrical discharge device connected thereto, said device having over an operating range a negative volt-ampere characteristic bordered by operating ranges having a positive volt-ampere characteristic, a condenser connected in parallel with said device, and a work circuit receiving current modified by said device.

5. An electric oscillator comprising a sealed container, a cathode therefor adapted to be heated to incandescence, an anode, a filling of inert gas at a pressure of the order of .005 to .075 millimeter of mercury and a condenser connected in shunt to said device.

6. In an oscillator the combination of an electron discharge device having an operating range of negative volt-ampere characteristic bordered by ranges of positive volt-ampere characteristic, means for supplying said device with electric energy having a constant characteristic and means in circuit with said device for storing and restoring energy between critical values at which the current carrying capacity of said device changes abruptly from one value to another value.

In witness whereof, I have hereunto set my hand this 5th day of February, 1921.

IRVING LANGMUIR.